United States Patent
Bai et al.

(10) Patent No.: US 12,016,006 B2
(45) Date of Patent: Jun. 18, 2024

(54) BEAM REPORT TRIGGERS AUTONOMOUS BEAM HOPPING

(71) Applicant: QUALCOMM Incorporated, San Diego, CA (US)

(72) Inventors: Tianyang Bai, Somerville, NJ (US); Konstantinos Dimou, San Francisco, CA (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 17/479,713

(22) Filed: Sep. 20, 2021

(65) Prior Publication Data

US 2023/0091246 A1    Mar. 23, 2023

(51) Int. Cl.
*H04W 72/044* (2023.01)
*H04W 24/10* (2009.01)

(52) U.S. Cl.
CPC ......... *H04W 72/046* (2013.01); *H04W 24/10* (2013.01)

(58) Field of Classification Search
CPC ............................. H04W 72/046; H04W 24/10
See application file for complete search history.

(56) References Cited

U.S. PATENT DOCUMENTS

| | | | |
|---|---|---|---|
| 2008/0146238 A1* | 6/2008 | Saito | H04L 5/0007 455/442 |
| 2016/0065294 A1* | 3/2016 | Kang | H04B 7/022 370/334 |
| 2020/0221401 A1* | 7/2020 | Zhu | H04W 52/42 |
| 2021/0274372 A1* | 9/2021 | Shi | H04B 7/024 |
| 2021/0360616 A1* | 11/2021 | Yi | H04W 72/21 |
| 2022/0190883 A1 | 6/2022 | Kaya et al. | |
| 2023/0084028 A1* | 3/2023 | Karimidehkordi | H04W 72/046 370/216 |

FOREIGN PATENT DOCUMENTS

WO    WO-2021118418 A1 *    6/2021    ........ H04W 36/0083
WO    WO-2023051188 A1 *    4/2023

* cited by examiner

*Primary Examiner* — Deepa Belur
(74) *Attorney, Agent, or Firm* — Procopio, Cory, Hargreaves & Savitch LLP

(57) ABSTRACT

Method and apparatus for a beam report triggering autonomous beam mode selection. The apparatus measures an RSRP of a current beam and at least one beam. The apparatus selects a beam mode for communication with the base station based on the RSRP report of the current beam and the at least one beam. The apparatus provides, to a base station, an RSRP report of the current beam and the at least one beam. The apparatus communicates with the base station based on a selected beam mode. The apparatus may maintain communication with the current beam. The apparatus may enable a beam hopping mode for communication with the base station. The apparatus may switch to a different beam for communication with the base station, wherein the different beam comprises a beam from the at least one beam.

28 Claims, 12 Drawing Sheets

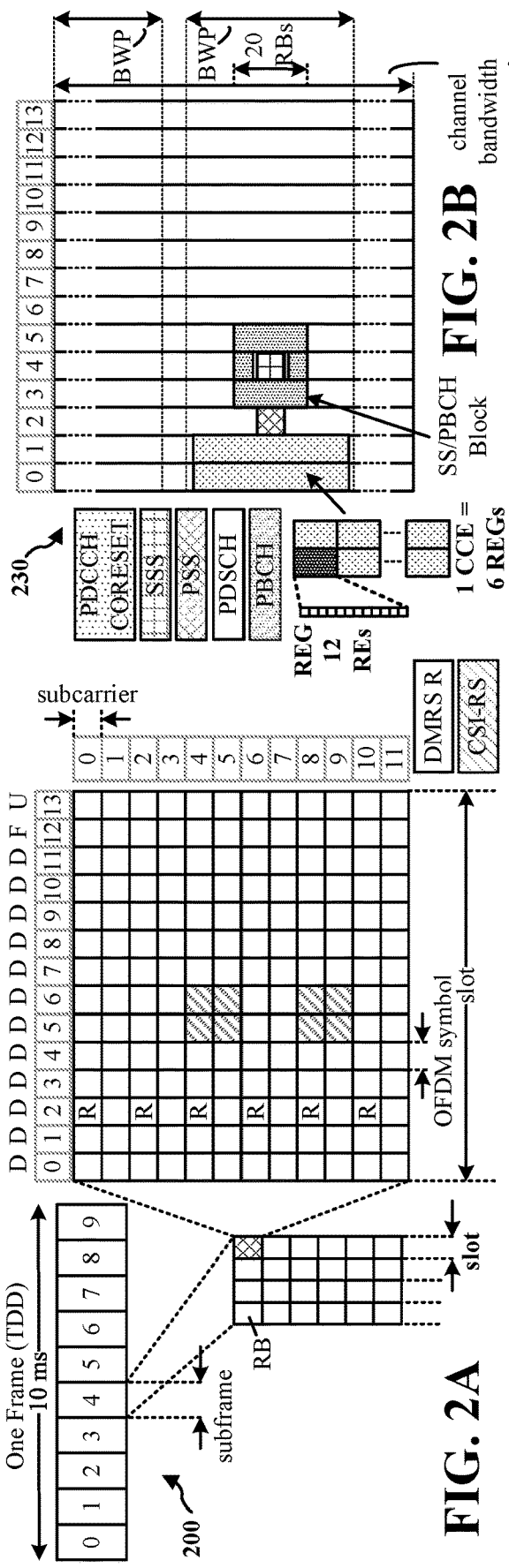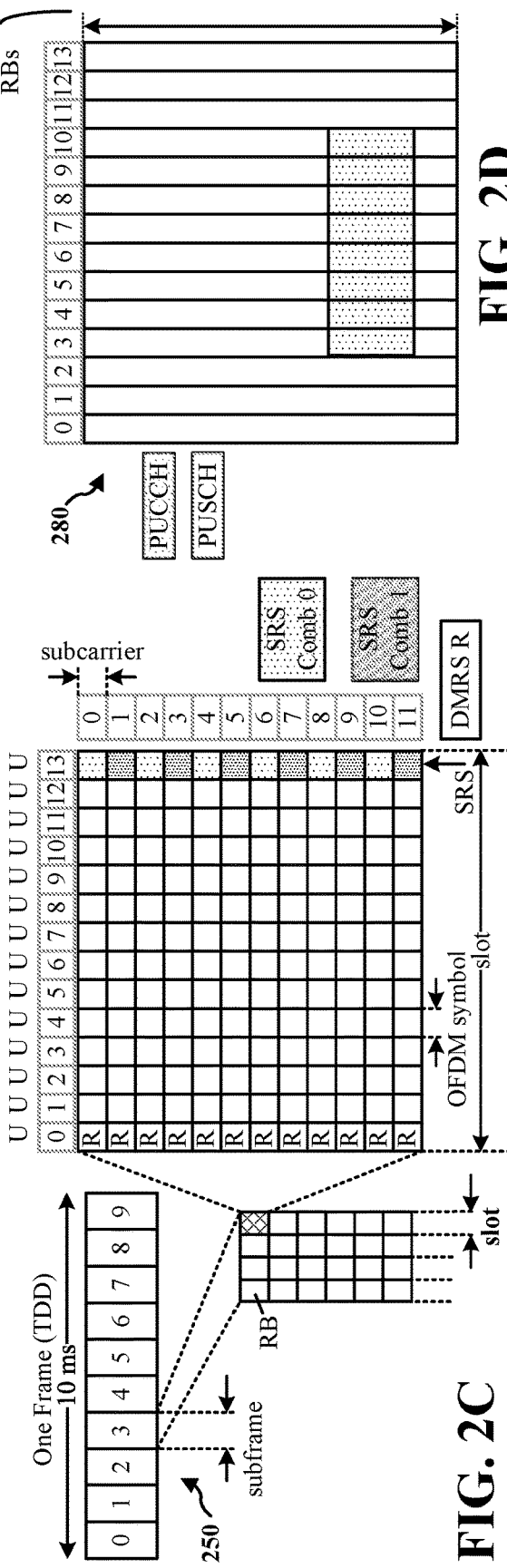
FIG. 2A
FIG. 2B
FIG. 2C
FIG. 2D

BEAM REPORT TRIGGERS AUTONOMOUS BEAM HOPPING

TECHNICAL FIELD

The present disclosure relates generally to communication systems, and more particularly, to a configuration for a beam report triggering autonomous beam mode selection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus may measure a reference signal received power (RSRP) of a current beam and at least one beam. The apparatus may select a beam mode for communication with the base station based on the RSRP report of the current beam and the at least one beam. The apparatus may provide, to a base station, an RSRP report of the current beam and the at least one beam. The apparatus may communicate with the base station based on a selected beam mode.

In an aspect of the disclosure, a method, a computer-readable medium, and an apparatus are provided. The apparatus may be a device at a base station. The device may be a processor and/or a modem at a base station or the base station itself. The apparatus may receive, from a user equipment (UE), a reference signal received power (RSRP) report of a current beam and at least one beam. The apparatus may select a beam mode for communication with the UE based on the RSRP report of the current beam and the at least one beam. The apparatus may communicate with the UE based on a selected beam mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
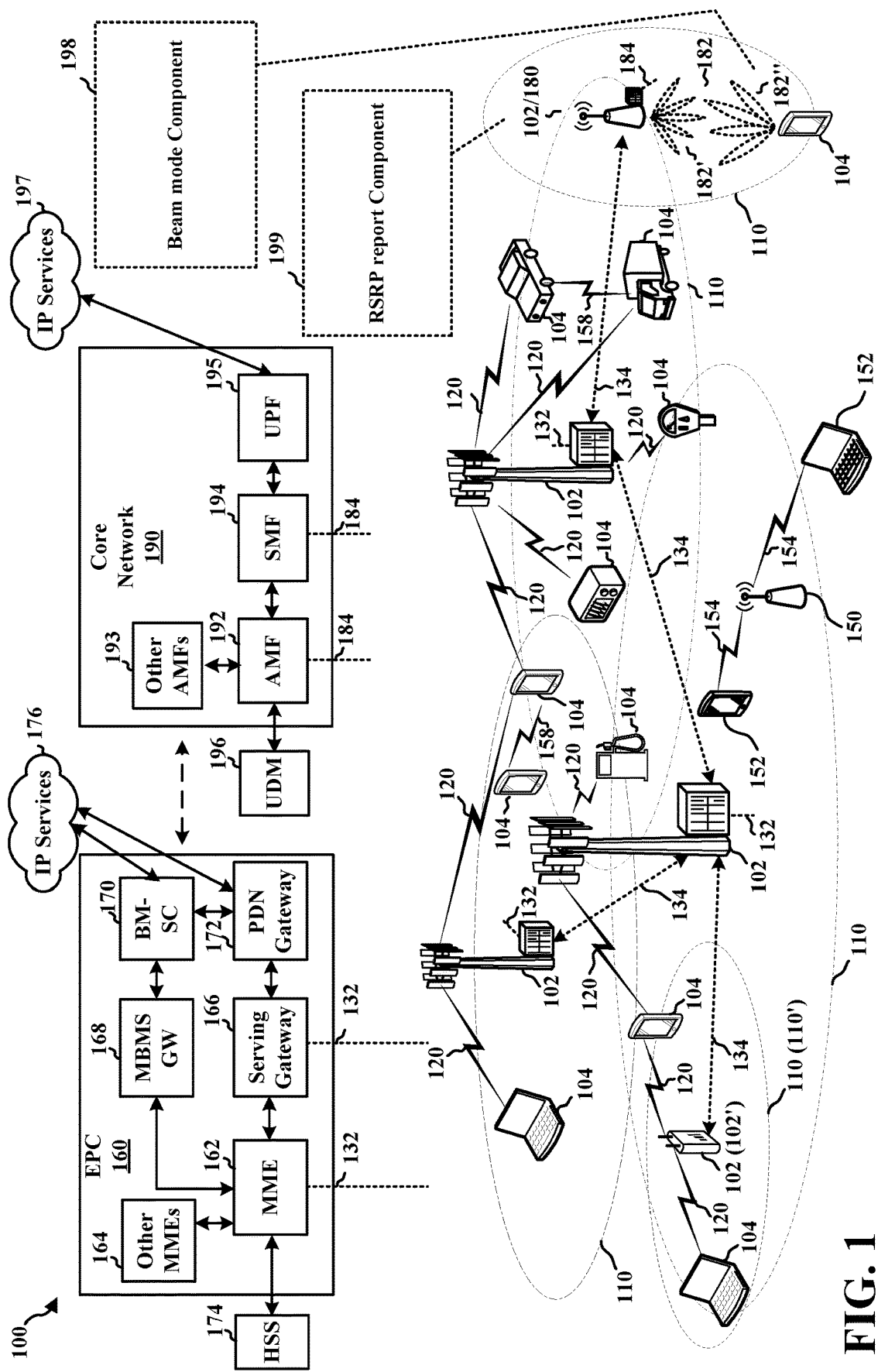
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to initiate a beam selection or activation based on beam measurement. For example, the UE 104 may comprise a beam mode component 198 configured to initiate a beam selection or activation based on beam measurement. The UE 104 may measure an RSRP of a current beam and at least one beam. The UE 104 may select a beam mode for communication with the base station based on the RSRP report of the current beam and the at least one beam. The UE 104 may provide, to a base station 180, an RSRP report of the current beam and the at least one beam. The UE may communicate with the base station 180 based on a selected beam mode.

Referring again to FIG. 1, in certain aspects, the base station 180 may be configured to initiate a beam selection or activation based on beam measurement. For example, the base station 180 may comprise an RSRP report component 199 that may be configured to initiate a beam selection or activation based on beam measurement. The base station 180 may receive, from a UE 104, an RSRP report of a current beam and at least one beam. The base station 180 may select a beam mode for communication with the UE 104 based on the RSRP report of the current beam and the at least one beam. The base station 180 may communicate with the UE 104 based on a selected beam mode.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
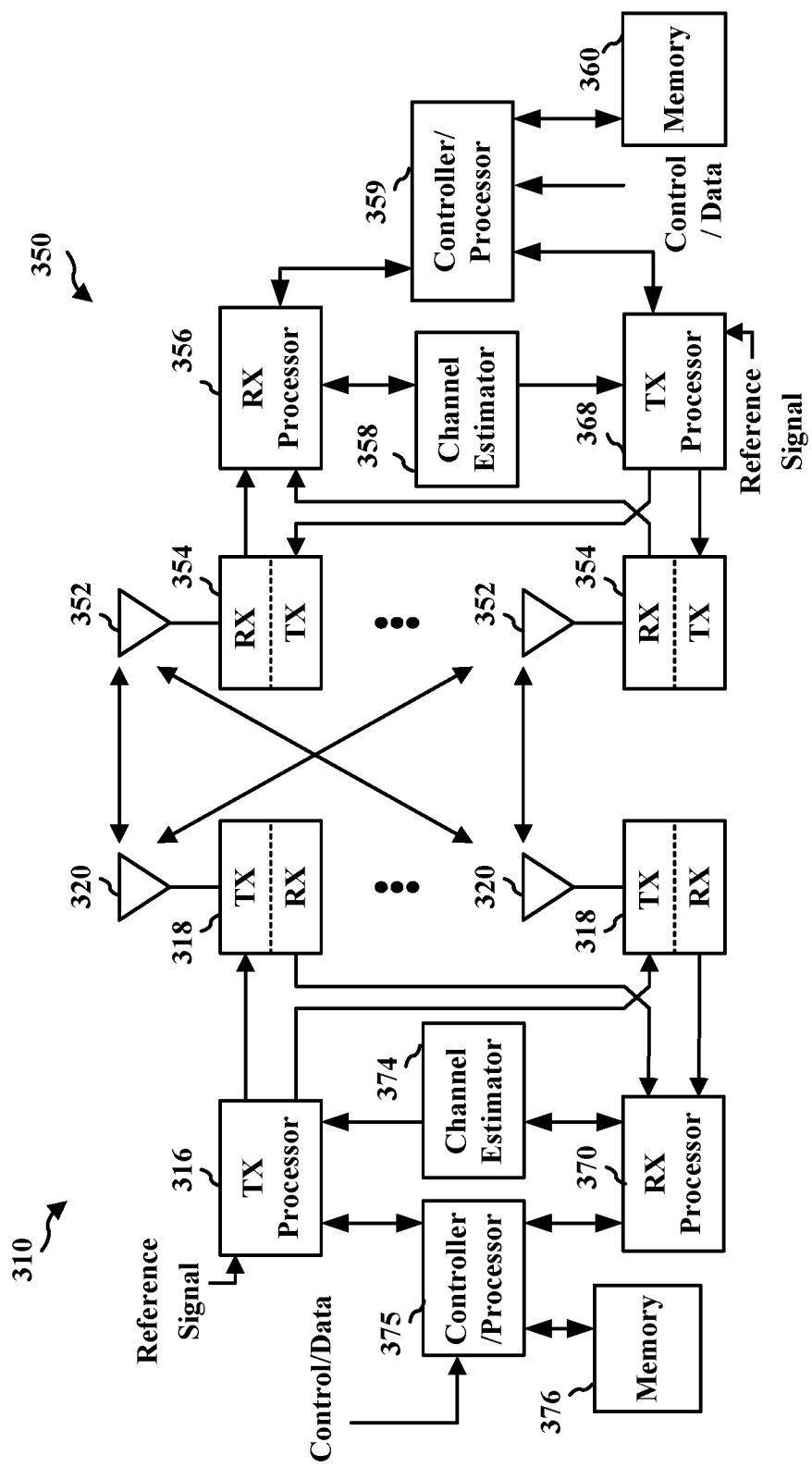
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communications, beam selection utilized for communication between UE and a base station may suffer due to latency. Some enhancements to facilitate advanced beam refinement or tracking may include a UE-initiated beam selection or activation based on beam measurement or reporting, without beam indication or activation from the network; beam measurement, reporting, refinement, or selection triggered by a beam indication without a CSI request; or aperiodic beam measurement or reporting based on multiple resource sets for reducing beam measurement latency. In some instances, latency may be reduced for MAC-CE based TCI state activation or frequency, time, beam tracking, or latency may be reduced for MAC-CE based pathloss reference signal (PL-RS) activation.

Aspects presented herein provide a configuration for UE initiated beam selection or activation based on beam measurement or reporting. For example, the UE may initiate a beam mode for communication with a base station based on a measured RSRP of a current beam of the base station. The UE may initiate the beam mode autonomously and without a beam indication or activation signaling from the base station. At least one advantage of the invention is that autonomous beam selection initiated by the UE may reduce latency of beam selection.

In some instances, the UE may send an RSRP report to the base station, where the RSRP report includes beam measurements of the base station. The UE, based on the beam measurements of the RSRP report may autonomously switch beams without explicit instructions from the base station. In some instances, the base station may make the corresponding beam switch in response to receiving the RSRP report. However, the RSRP report may be sent via PUCCH or PUSCH which may not be as reliable as PDCCH. For example, if the PUCCH or PUSCH having the RSRP report is not properly received or decoded by the base station, and the UE switches beams, then the base station may not perform the corresponding beam switch due in part to not properly receiving or decoding the RSRP report within the PUCCH or PUSCH. In some instances, such as the UE being at a cell edge, it is possible that none of the beams are measuring well, such that the UE may rely on beam hopping and slot aggregation to improve the signal to noise ratio (SNR) or diversity.

Figure 4:
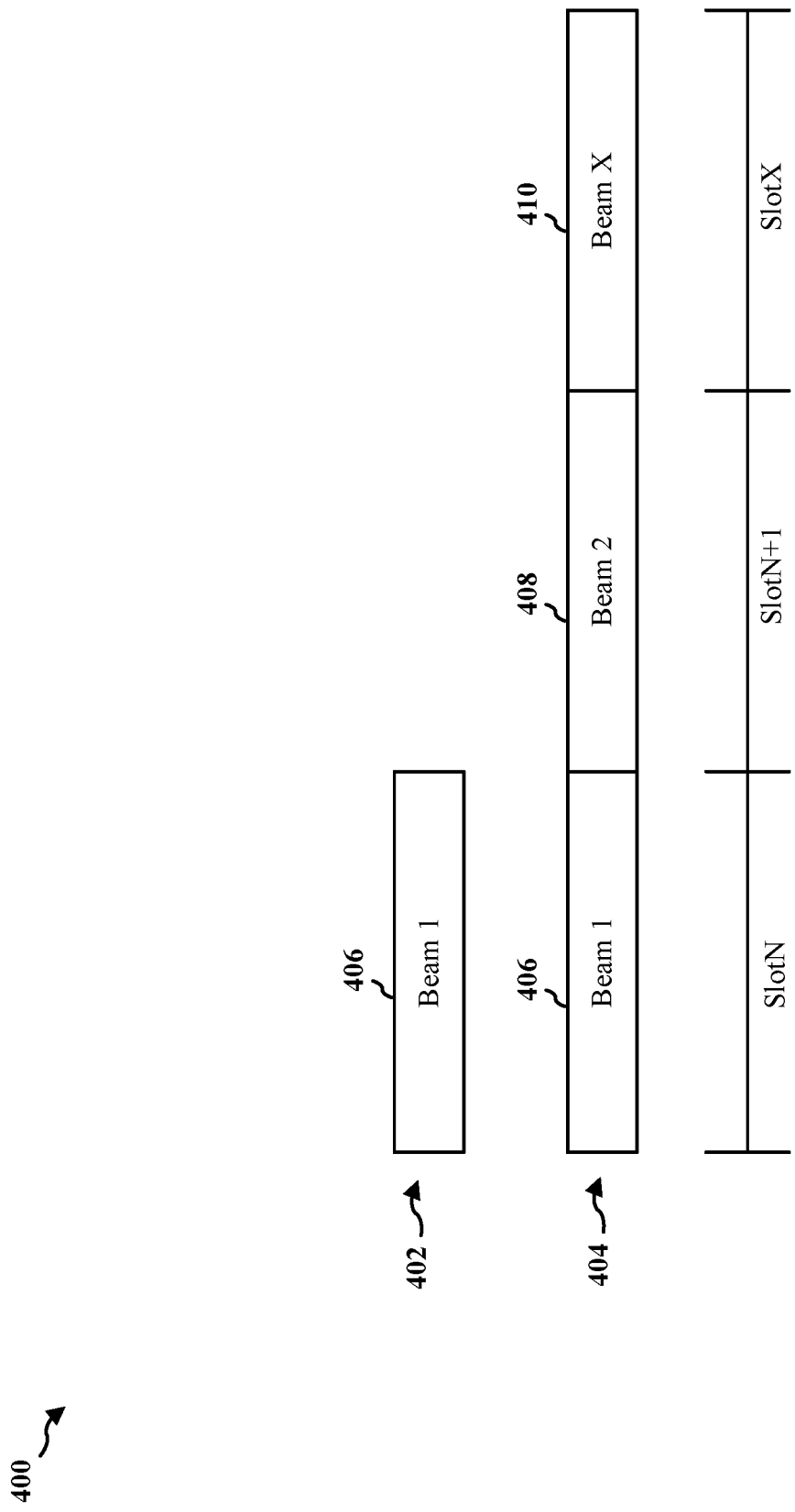
FIG. 4 is a diagram illustrating an example of a beam hopping configuration.

FIG. 4 is a diagram 400 illustrating an example of a beam hopping configuration. In some instances, if the RSRP report indicates that some beams are weak, the RSRP report may autonomously trigger beam hopping and repetition as slot aggregation in the transmission originally scheduled on the beam. For example, 402 may refer to the original beam, while 404 may refer to a beam hopping configuration triggered by the RSRP report. In the diagram 400, the original beam 402 may comprise beam 1 406, and the beam hopping configuration 404 may comprise the beam 1 406, beam 2 408, and beam X 410. The beam hopping configuration 404 may be utilized in instances where the RSRP report indicates that certain beams are weak. In some instances, if the originally scheduled beam (e.g., beam 1 406) is included within the beam hopping configuration 404, then the beam hopping configuration 404 may be more robust than a beam switch triggered by the RSRP report. For example, if the RSRP report is missed by the base station, the base station may still be able to communicate with the UE using the original beam (e.g., beam 1 406) of the beam hopping configuration 404. If the base station were to miss the RSRP report in the first slot (e.g., SlotN), the UE may still communicate using the original beam (e.g., beam 1 406) due to the repetition.

The beam hopping and repetition configuration may be applied to PUSCH, PUCCH, PDSCH, or PDCCH. The triggering of the beam hopping and repetition configuration may be indicated based on a rule or by the UE. For example, the beam hopping and repetition configuration may be triggered when the RSRP of all the reported beams is lower than a first threshold (e.g., X dB) or the difference in RSRP between the best and the second beast beam is less than a second threshold (e.g., Y dB). In another example, the beam hopping repetition configuration may be triggered by additional bits within the RSRP report to indicate whether the UE has enabled the beam hopping repetition configuration.

In some instances, the beam hopping and repetition configuration may be pre-configured in RRC signaling, identified based on a rule, or within an indication. For PDCCH repetition, a search space and CORESET may be preconfigured for repetition. The redundancy version (RV) for repetitions may be identified based on the rule. The repetition factor may be pre-configured in RRC, pre-defined, or identified based on the RSRP report. The beams for hopping may be identified based on a pre-configuration, a rule, or the RSRP report. For example, a subset of the reported beams within the RSRP report may be used for beam hopping, such as beams having an RSRP larger than a third threshold. In instances where the base station does not receive the RSRP report, the original scheduled transmission configuration may be applied as part of the repetition. For example, for downlink transmission, the UE may detect DMRS of the other repetitions to determine whether soft combining across repetition is feasible.

Figure 5:
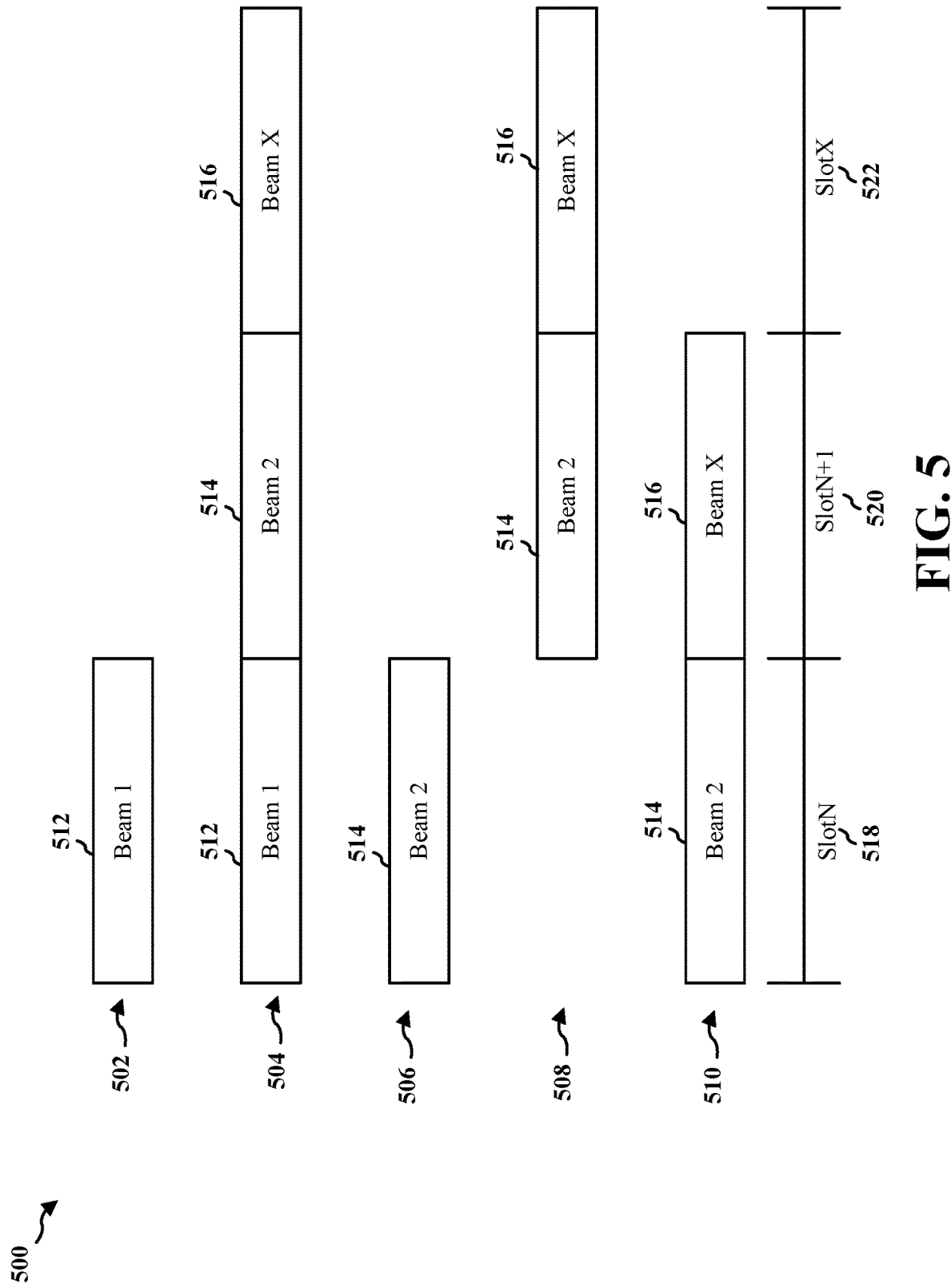
FIG. 5 is a diagram illustrating examples of beam modes.

FIG. 5 is a diagram 500 illustrating examples of beam modes. When the UE measures the beams of the base station, the results of the measurements may be included in the RSRP report that is provided to the base station. The UE, based on the measurements of the beams, may trigger selection of a beam mode (e.g., 502, 504, 506, 508, 510) for communication with the base station. Beam mode 502 may comprise the original beam (e.g., beam 1 512), such that the UE maintains communication with the base station using the current beam or the original beam. The beam 1 512 may be within the originally scheduled slot (e.g., SlotN 518). In some aspects, the beam mode 502 may be selected if none of the beams included in the RSRP report, other than the original beam (e.g., serving beam), have an RSRP that is greater than a first threshold in comparison to the RSRP of the original beam. In some aspects, the beam mode 502 may be selected if the original beam has an RSRP that is greater than a second threshold.

Beam mode 504 may comprise a beam hopping configuration which includes the original beam (e.g., beam 1 512), beam 2 514, and beam X 516. Beam 1 512 may be within the originally scheduled slot (e.g., SlotN 518), while beam 2 514 may be within slotN+1 520 and beam X 516 may be within SlotX 522. The beam mode 504 may comprise beam hopping and repetition. The repetition factor may be pre-configured or based on the RSRP report. The beam mode 504 may be enabled if the RSRP of the original beam (e.g., beam 1 512) is less than a third threshold and none of the beams included in the RSRP report have an RSRP that is greater than the first threshold in comparison to the RSRP of the original beam. In some aspects, the beam mode 504 may comprise the original beam and a subset of beams from the beams included in the RSRP report.

Beam mode 506 may comprise a beam switch configuration. For example, beam mode 506 may trigger the switching of the beam to a different beam from the original beam. For example, the beam may be switched to beam 2 514 and may be scheduled within slotN 518. The beam mode 506 may cause the UE to switch to the different beam for communication with the base station. The different beam (e.g., beam 2 514) may comprise a beam included within the RSRP report.

Beam mode 508 may comprise another beam hopping configuration which does not include the original beam. The beam hopping configuration of beam mode 508 may comprise different beams (e.g., beam 2 514, beam X 516). For example, beam 2 514 may be scheduled in a different slot (e.g., slotN+1 520) instead of the slot (e.g., slotN 518) of the original beam, while beam X 516 may be scheduled in slotX 522. The different beams of the beam hopping configuration of beam mode 508 may comprise a subset of beams included in the RSRP report. The originally scheduled resource associated with the original beam may be skipped. The beam mode 508 may comprise beam hopping and repetition. The repetition factor may be pre-configured or based on the RSRP report.

Beam mode 510 may comprise yet another beam hopping configuration which does not include the original beam. The beam hopping configuration of beam mode 510 may comprise different beams (e.g., beam 2 514, beam X 516). For example, beam 2 514 may be scheduled in the slot (e.g., slotN 518) corresponding to the originally scheduled beam, while beam X 516 may be scheduled in slotN+1 520. The different beams of the beam hopping configuration of beam mode 510 may comprise a subset of beams included in the RSRP report. The originally scheduled resource associated with the original beam may be monitored using a different beam (e.g., beam 2 514) from the subset of beams included within the RSRP report. The beam mode 508 may comprise beam hopping and repetition. The repetition factor may be pre-configured or based on the RSRP report.

In some aspects, the base station may determine which action to follow based on the RSRP report received from the UE or a predefined rule. For example, the RSRP report may comprise an indication indicating the beam mode selected by the UE. In some instances, the base station may follow the beam mode selected by the UE. In some instances, the base station may ignore or overrule the beam mode selected by the UE and select a beam mode instead. For example, if none of the beams reported in the RSRP report is greater than a first threshold (e.g., X dB) than the original beam (e.g., serving beam), or if the original beam is greater than a second threshold (e.g., W dB), then the base station takes no action and maintains communication using the original beam. In another example, if the best beam reported in the RSRP report is greater than the first threshold in comparison to the original beam, and the best beam is greater than a third threshold (e.g., Y dB), then the base station may select a beam mode comprising a beam switch configuration. In yet another example, if the original beam is less than a fourth threshold (e.g., Z bB), and none of the other beams reported in the RSRP report is greater than the first threshold (e.g., X dB) than the original beam, then the base station may select a beam mode comprising a beam hopping configuration. The selection of the beam mode selected by the base station may be based, in part, on the RSRP report.

Figure 6:
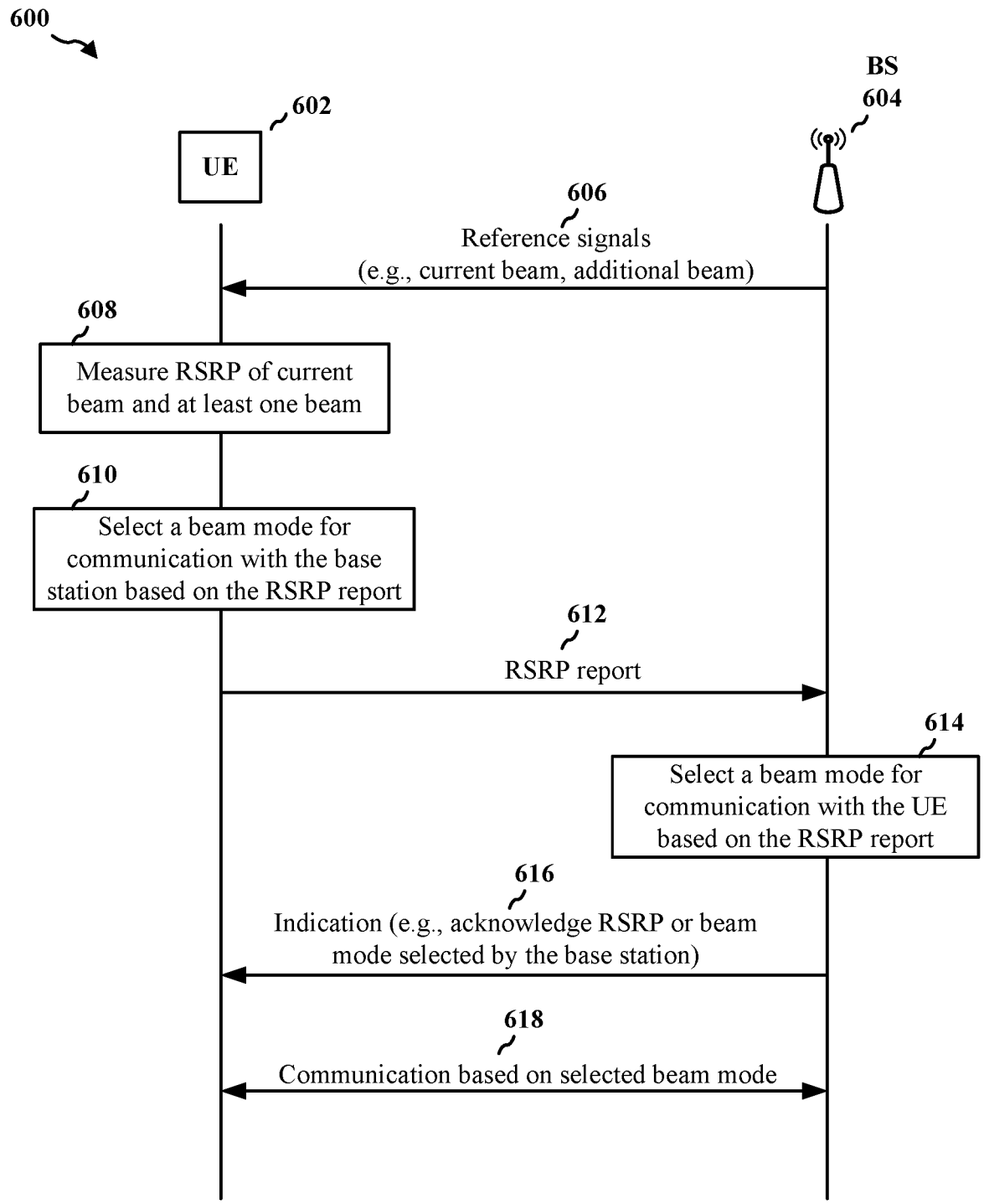
FIG. 6 is a call flow diagram of signaling between a UE and a base station.

FIG. 6 is a call flow diagram 600 of signaling between a UE 602 and a base station 604. The base station 604 may be configured to provide at least one cell. The UE 602 may be configured to communicate with the base station 604. For example, in the context of FIG. 1, the base station 604 may correspond to base station 102/180 and, accordingly, the cell may include a geographic coverage area 110 in which communication coverage is provided and/or small cell 102' having a coverage area 110'. Further, a UE 602 may correspond to at least UE 104. In another example, in the context of FIG. 3, the base station 604 may correspond to base station 310 and the UE 602 may correspond to UE 350.

At 606, the base station 604 may transmit one or more reference signals to the UE 602. The UE 602 may receive the one or more reference signals from the base station 604. The reference signals may correspond to a current beam that is serving the UE 602 and at least one beam of the base station 604 that may serve the UE 602.

At 608, the UE 602 may measure an RSRP of the current beam and the at least one beam. The UE may measure the RSRP of the current beam of the base station 604 that is serving the UE 602. The UE 602 may measure the RSRP of the at least one beam of the base station 604, where the at least one beam may provide service to the UE 602.

At 610, the UE 602 may select a beam mode for communication with the base station 604. The UE 602 may select the beam mode for communication with the base station 604 based on the RSRP report of the current beam and the at least one beam. In some aspects, the beam mode may comprise at least one of maintain communication with the current beam, switch to a different beam, or enable a beam hopping mode. In some aspects, the RSRP report may comprise an indication indicating the beam mode selected by the UE. In some aspects, the UE may maintain communication with the current beam. The UE may maintain communication with the base station with the current beam. The UE maintaining communication with the base station with the current beam may comprise the selected beam mode. In some aspects, communication may be maintained with the current beam if none of the at least one beam has an RSRP that is greater than a first threshold in comparison to the RSRP of the current beam. In some aspects, communication may be maintained with the current beam if the current beam has an RSRP that is greater than a second threshold. In some aspects, the UE may enable a beam hopping mode for communication with the base station. The UE enabling the beam hopping mode for communication with the base station may comprise the selected beam mode. In some aspects, the beam hopping mode may comprise beam hopping plus repetition. The repetition may be pre-configured or based on the RSRP report. In some aspects, the beam hopping mode may be enabled if the RSRP of the current beam is less than a third threshold, and none of the at least one beam has an RSRP that is greater than a first threshold in comparison to the RSRP of the current beam. In some aspects, the beam hopping mode may comprise the current beam and a subset of beams of the at least one beam. In some aspects, the beam hopping mode may comprise a subset of beams of the at least one beam and may exclude the current beam. In some aspects, a resource originally scheduled may be skipped when the beam hopping mode is enabled. In some aspects, the resource originally scheduled may be monitored using a different beam from the subset of beams when the beam hopping mode is enabled. In some aspects, the UE may switch to a different beam. The UE may switch to the different beam for communication with the base station. In some aspects, the different beam may comprise a beam from the at least one beam.

At 612, the UE 602 may provide an RSRP report of the current beam and the at least one beam. The UE 602 may provide the RSRP report of the current beam and the at least one beam to the base station 604. The base station 604 may receive the RSRP report from the UE 602.

At 614, the base station 604 may select a beam mode for communication with the UE. For example, 1104 may be performed by beam mode component 1242 of apparatus 1202. The base station may select the beam mode for communication with the UE based on the RSRP report of the current beam and the at least one beam. In some aspects, the beam mode may comprise at least one of maintain communication with the current beam, switch to a different beam, or enable a beam hopping mode. In some aspects, the RSRP report may comprise an indication indicating the beam mode selected by the UE. For example, in such aspects, the base station 604, after receipt of the RSRP report may determine that the beam mode selected by the UE may not be the optimal beam mode and may select a different beam mode. In some aspects, the base station may ignore or override the beam mode selected by the UE and select another beam mode that may be different or the same as the beam mode selected by the UE. In some aspects, the base station may maintain communication with the UE with the current beam of the UE. In some aspects, communication may be maintained with the current beam if none of the at least one beam has an RSRP that is greater than a first threshold in comparison to the RSRP of the current beam. In some aspects, communication may be maintained with the current beam if the current beam has an RSRP that is greater than a second threshold. In some aspects, the base station may enable a beam hopping mode for communication with the UE. In some aspects, the beam hopping mode may comprise beam hopping plus repetition. The repetition may be pre-configured or based on the RSRP report. In some aspects, the beam hopping mode may be enabled if the RSRP of the current beam is less than a third threshold, and none of the at least one beam has an RSRP that is greater than a first threshold in comparison to the RSRP of the current beam. In some aspects, the beam hopping mode may comprise the current beam and a subset of beams of the at least one beam. In some aspects, the beam hopping mode may comprise a subset of beams of the at least one beam and may exclude the current beam. In some aspects, a resource originally scheduled may be skipped when the beam hopping mode is enabled. In some aspects, the resource originally scheduled may be monitored using a different beam from the subset of beams when the beam hopping mode is enabled. In some aspects, the base station may switch to a different beam. The base station may switch to the different beam for communication with the UE. In some aspects, the different beam may correspond to a beam from the at least one beam indicated in the RSRP report.

At 616, the base station 604 may transmit an indication in response to the RSRP report. The base station 604 may transmit the indication to the UE 602 in response to receiving the RSRP report from the UE. The UE 602 may receive the indication from the base station 604. In some aspects, the indication may acknowledge receipt of the RSRP report received from the UE. In some aspects, the indication may comprise a beam mode selected by the base station. For example, the base station may receive the RSRP report and select a beam mode for communication with the UE based on the RSRP report. In some aspects, the RSRP report may comprise an indication of a beam mode selected by the UE, such that the base station may override the beam mode selected by the UE. The base station may transmit the indication to the UE having a beam mode selected by the base station that overrides the beam mode selected by the UE. Communication between the UE and the base station may be based on the beam mode selected by the base station.

At 618, the UE 602 and the base station 604 may communicate with each other based on the selected beam mode. The selected beam mode may be selected by the UE 602 or the base station 604.

Figure 7:
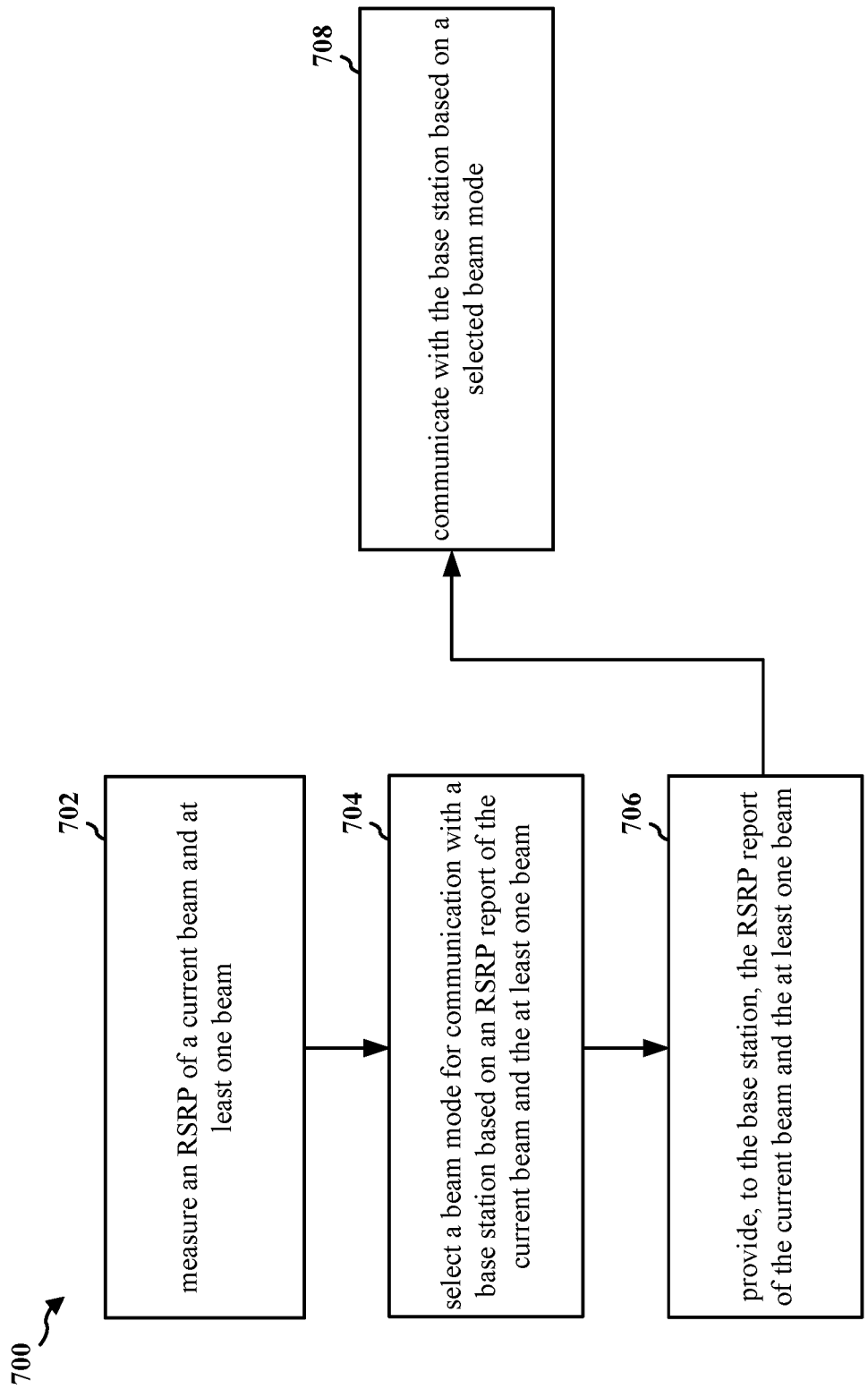
FIG. 7 is a flowchart of a method of wireless communication.

FIG. 7 is a flowchart 700 of a method of wireless communication. The method may be performed by a UE or a component of a UE (e.g., the UE 104; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to initiate a beam selection or activation based on beam measurement.

At 702, the UE may measure an RSRP of a current beam and at least one beam. For example, 702 may be performed by measurement component 940 of apparatus 902. The UE may measure the RSRP of a current beam of a base station that is serving the UE. The UE may measure the RSRP of the at least one beam of the base station, where the at least one beam may provide service to the UE.

At 704, the UE may select a beam mode for communication with the base station. For example, 704 may be performed by beam mode component 944 of apparatus 902. The UE may select the beam mode for communication with the base station based on the RSRP report of the current beam and the at least one beam. In some aspects, the beam mode may comprise at least one of maintain communication with the current beam, switch to a different beam, or enable a beam hopping mode. In some aspects, the RSRP report may comprise an indication indicating the beam mode selected by the UE.

At 706, the UE may provide an RSRP report of the current beam and the at least one beam. For example, 706 may be performed by RSRP report component 942 of apparatus 902. The UE may provide the RSRP report of the current beam and the at least one beam to the base station.

At 708, the UE may communicate based on a selected beam mode. For example, 708 may be performed by communication component 948 of apparatus 902. The UE may communicate with the base station based on the selected beam mode.

Figure 8:
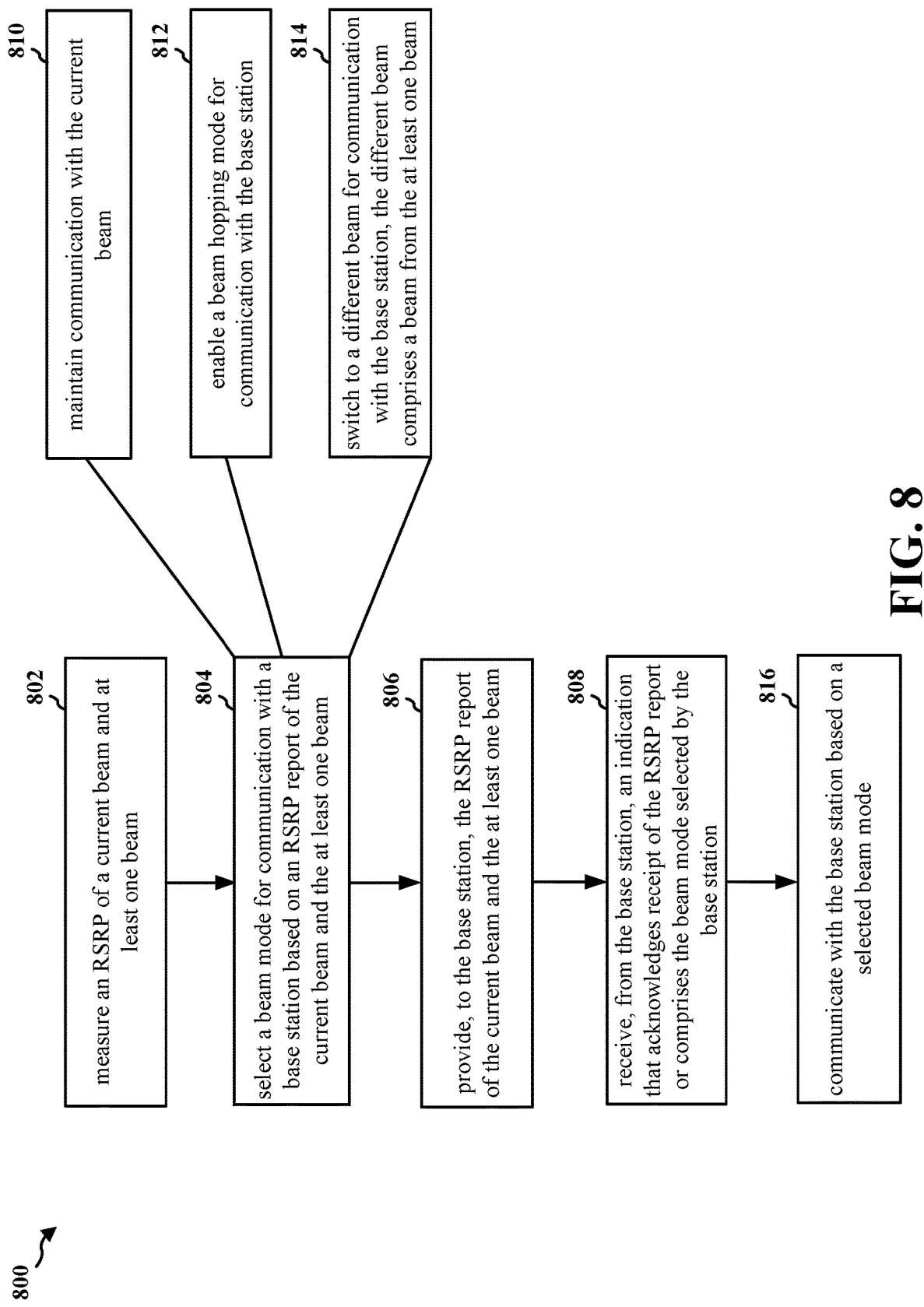
FIG. 8 is a flowchart of a method of wireless communication.

FIG. 8 is a flowchart 800 of a method of wireless communication. The method may be performed by a UE or a component of a UE (e.g., the UE 104; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to initiate a beam selection or activation based on beam measurement.

At 802, the UE may measure an RSRP of a current beam and at least one beam. For example, 802 may be performed by measurement component 940 of apparatus 902. The UE may measure the RSRP of a current beam of a base station that is serving the UE. The UE may measure the RSRP of the at least one beam of the base station, where the at least one beam may provide service to the UE.

At 804, the UE may select a beam mode for communication with the base station. For example, 804 may be performed by beam mode component 944 of apparatus 902. The UE may select the beam mode for communication with the base station based on the RSRP report of the current beam and the at least one beam. In some aspects, the beam mode may comprise at least one of maintain communication with the current beam, switch to a different beam, or enable a beam hopping mode. In some aspects, the RSRP report may comprise an indication indicating the beam mode selected by the UE. For example, at 810, the UE may maintain communication with the current beam. For example, 810 may be performed by beam mode component 944 of apparatus 902. The UE may maintain communication with the base station with the current beam. The UE maintaining communication with the base station with the current beam may comprise the selected beam mode. In some aspects, communication may be maintained with the current beam if none of the at least one beam has an RSRP that is greater than a first threshold in comparison to the RSRP of the current beam. In some aspects, communication may be maintained with the current beam if the current beam has an RSRP that is greater than a second threshold.

In another example, at 812, the UE may enable a beam hopping mode for communication with the base station. For example, 812 may be performed by beam mode component 944 of apparatus 902. The UE enabling the beam hopping mode for communication with the base station may comprise the selected beam mode. In some aspects, the beam hopping mode may comprise beam hopping plus repetition. The repetition may be pre-configured or based on the RSRP report. In some aspects, the beam hopping mode may be enabled if the RSRP of the current beam is less than a third threshold, and none of the at least one beam has an RSRP that is greater than a first threshold in comparison to the RSRP of the current beam. In some aspects, the beam hopping mode may comprise the current beam and a subset of beams of the at least one beam. For example, a slot using the current beam may be used for the originally scheduled resource. The originally scheduled resource may be scheduled by the base station for communication with the UE. In some aspects, the beam hopping mode may comprise a subset of beams of the at least one beam and may exclude the current beam. In some aspects, a resource originally scheduled may be skipped when the beam hopping mode is enabled. In some aspects, the resource originally scheduled may be monitored using a different beam from the subset of beams when the beam hopping mode is enabled.

In yet another example, at 814, the UE may switch to a different beam. For example, 814 may be performed by beam mode component 944 of apparatus 902. The UE may switch to the different beam for communication with the base station. In some aspects, the different beam may comprise a beam from the at least one beam.

At 806, the UE may provide an RSRP report of the current beam and the at least one beam. For example, 806 may be performed by RSRP report component 942 of apparatus 902. The UE may provide the RSRP report of the current beam and the at least one beam to the base station.

At 808, the UE may receive an indication in response to the RSRP report. For example, 808 may be performed by indication component 946 of apparatus 902. The UE may receive the indication, in response to the RSRP report, from the base station. In some aspects, the indication may acknowledge receipt of the RSRP report transmitted from the UE to the base station. In some aspects, the indication may comprise a beam mode selected by the base station. For example, the base station may receive the RSRP report and select a beam mode for communication with the UE based on the RSRP report. In some aspects, the RSRP report may comprise an indication of a beam mode selected by the UE, such that the base station may override the beam mode selected by the UE. The base station may transmit the indication to the UE having a beam mode selected by the base station that overrides the beam mode selected by the UE. Communication between the UE and the base station may be based on the beam mode selected by the base station.

At 816, the UE may communicate based on a selected beam mode. For example, 816 may be performed by communication component 948 of apparatus 902. The UE may communicate with the base station based on the selected beam mode.

Figure 9:
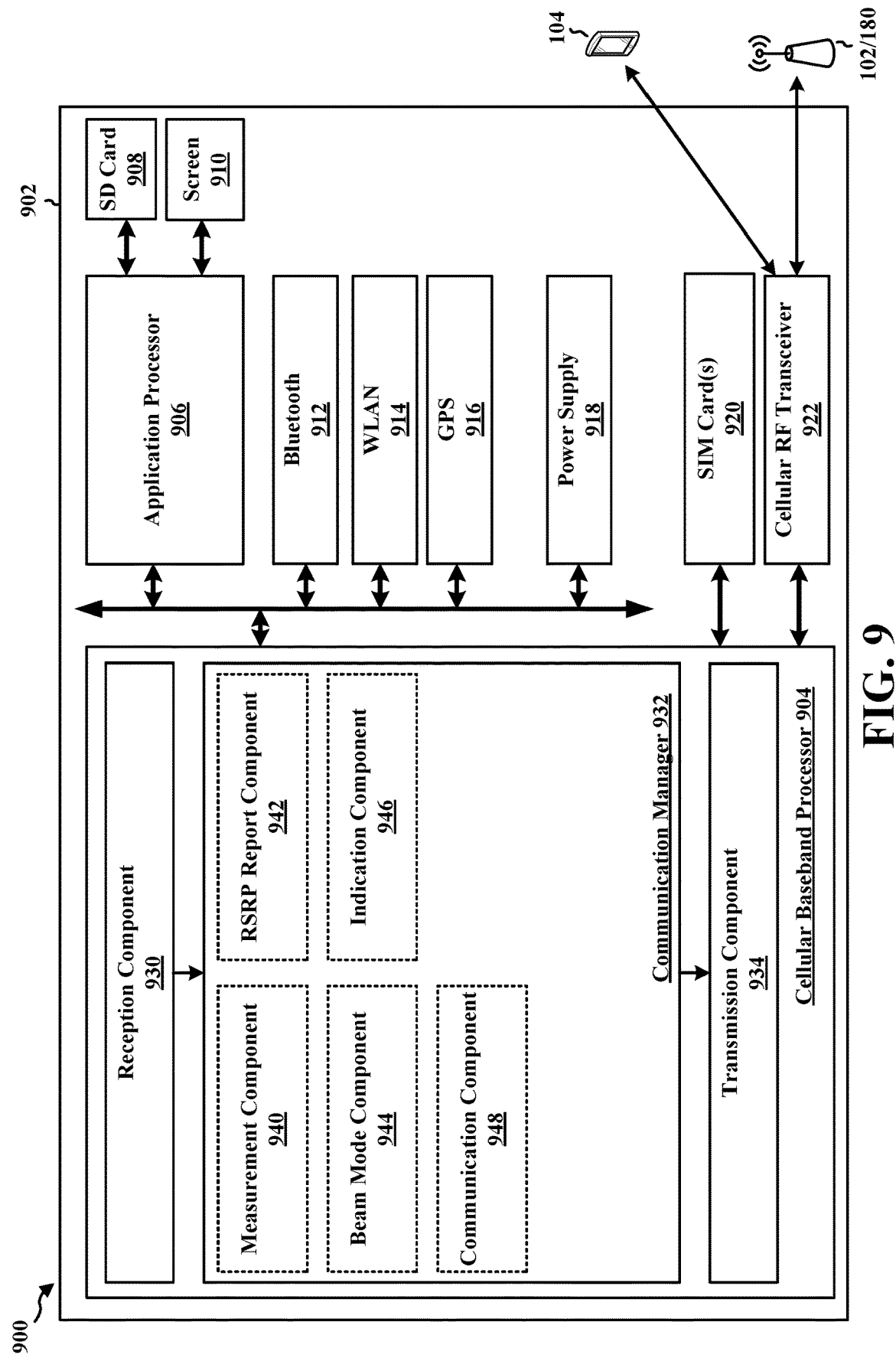
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a measurement component 940 that is configured to measure an RSRP of a current beam and at least one beam, e.g., as described in connection with 702 of FIG. 7 or 802 of FIG. 8. The communication manager 932 further includes an RSRP report component 942 that is configured to provide an RSRP report of the current beam and the at least one beam, e.g., as described in connection with 706 of FIG. 7 or 806 of FIG. 8. The communication manager 932 further includes a beam mode component 944 that is configured to select a beam mode for communication with the base station, e.g., as described in connection with 704 of FIG. 7 or 804 of FIG. 8. The beam mode component 944 may be further configured to maintain communication with the current beam, e.g., as described in connection with 810 of FIG. 8. The beam mode component 944 may be further configured to enable a beam hopping mode for communication with the base station, e.g., as described in connection with 812 of FIG. 8. The beam mode component 944 may be further configured to switch to a different beam, e.g., as described in connection with 814 of FIG. 8. The communication manager 932 further includes an indication component 946 that is configured to receive an indication in response to the RSRP report, e.g., as described in connection with 808 of FIG. 8. The communication manager 932 further includes a communication component 948 that is configured to communicate based on a selected beam mode, e.g., as described in connection with 708 of FIG. 7 or 816 of FIG. 8.

The apparatus may include additional components that perform each of the blocks of the algorithm in the flowcharts of FIGS. 7 and 8. As such, each block in the flowcharts of FIGS. 7 and 8 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for measuring an RSRP of a current beam and at least one beam. The apparatus includes means for providing, to a base station, an RSRP report of the current beam and the at least one beam. The apparatus includes means for selecting a beam mode for communication with the base station based on the RSRP report of the current beam and the at least one beam. The apparatus includes means for communicating with the base station based on a selected beam mode. The apparatus further includes means for receiving, from the base station, an indication that acknowledges receipt of the RSRP report or comprises the beam mode selected by the base station. Communication between the UE and the base station is based on the beam mode selected by the base station. The apparatus further includes means for maintaining communication with the current beam. The apparatus further includes means for enabling a beam hopping mode for communication with the base station. The apparatus further includes means for switching to a different beam for communication with the base station. The different beam comprises a beam from the at least one beam. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
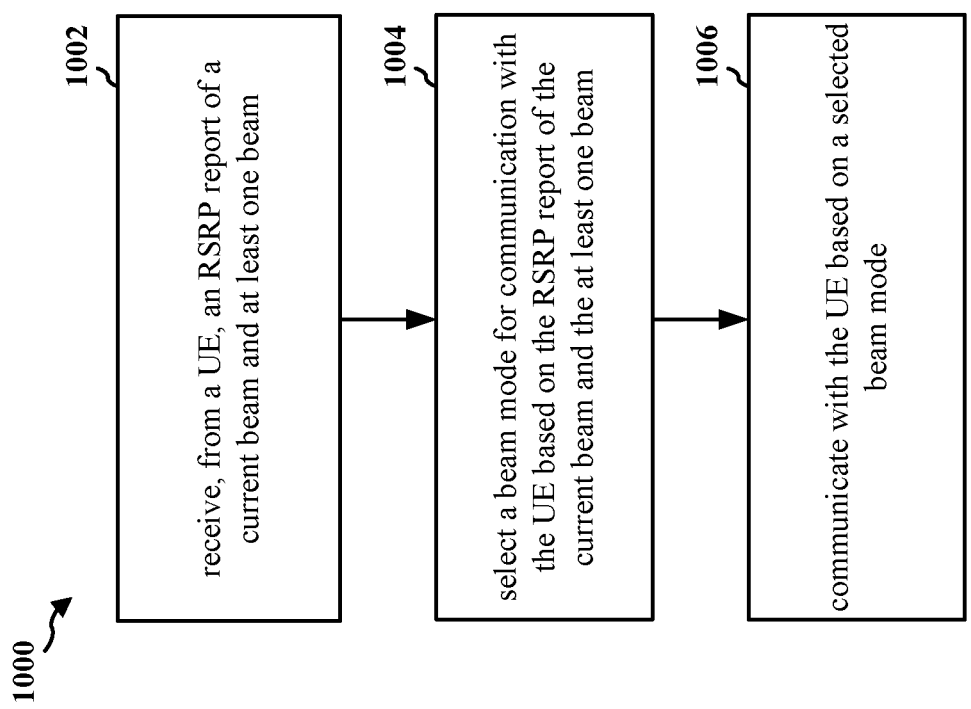
FIG. 10 is a flowchart of a method of wireless communication.

FIG. 10 is a flowchart 1000 of a method of wireless communication. The method may be performed by a base station or a component of a base station (e.g., the base station 102/180; the apparatus 1202; the baseband unit 1204, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to initiate a beam selection or activation based on beam measurement.

At 1002, the base station may receive an RSRP report of a current beam and at least one beam. For example, 1002 may be performed by RSRP report component 1240 of apparatus 1202. The base station may receive the RSRP report of the current beam and the at least one beam from the UE. The UE may measure the RSRP of a current beam of a base station that is serving the UE. The UE may measure the RSRP of the at least one beam of the base station, where the at least one beam may provide service to the UE.

At 1004, the base station may select a beam mode for communication with the UE. For example, 1004 may be performed by beam mode component 1242 of apparatus 1202. The base station may select the beam mode for communication with the UE based on the RSRP report of the current beam and the at least one beam. In some aspects, the beam mode may comprise at least one of maintain communication with the current beam, switch to a different beam, or enable a beam hopping mode. In some aspects, the RSRP report may comprise an indication indicating the beam mode selected by the UE.

At 1006, the base station may communicate based on the selected beam mode. For example, 1006 may be performed by communication component 1246 of apparatus 1202. The base station may communicate with the UE based on the selected beam mode.

Figure 11:
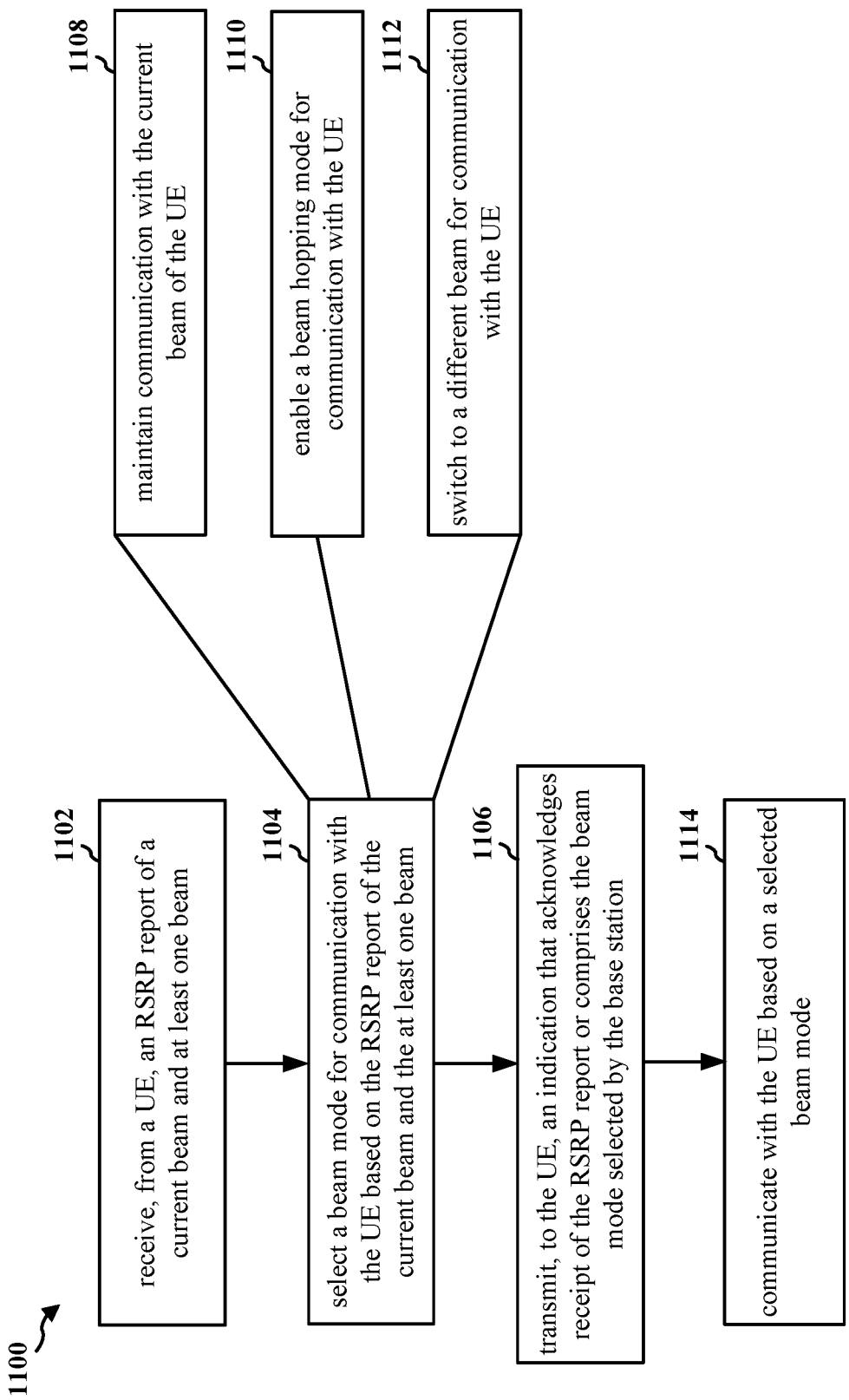
FIG. 11 is a flowchart of a method of wireless communication.

FIG. 11 is a flowchart 1100 of a method of wireless communication. The method may be performed by a base station or a component of a base station (e.g., the base station 102/180; the apparatus 1202; the baseband unit 1204, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to initiate a beam selection or activation based on beam measurement.

At 1102, the base station may receive an RSRP report of a current beam and at least one beam. For example, 1102 may be performed by RSRP report component 1240 of apparatus 1202. The base station may receive the RSRP report of the current beam and the at least one beam from the UE. The UE may measure the RSRP of a current beam of a base station that is serving the UE. The UE may measure the RSRP of the at least one beam of the base station, where the at least one beam may provide service to the UE.

At 1104, the base station may select a beam mode for communication with the UE. For example, 1104 may be performed by beam mode component 1242 of apparatus 1202. The base station may select the beam mode for communication with the UE based on the RSRP report of the current beam and the at least one beam. In some aspects, the beam mode may comprise at least one of maintain communication with the current beam, switch to a different beam, or enable a beam hopping mode. In some aspects, the RSRP report may comprise an indication indicating the beam mode selected by the UE. For example, at 1108, the base station may maintain communication with the UE with the current beam of the UE. For example, 1108 may be performed by beam mode component 1242 of apparatus 1202. In some aspects, communication may be maintained with the current beam if none of the at least one beam has an RSRP that is greater than a first threshold in comparison to the RSRP of the current beam. In some aspects, communication may be maintained with the current beam if the current beam has an RSRP that is greater than a second threshold.

In another example, at 1110, the base station may enable a beam hopping mode for communication with the UE. For example, 1110 may be performed by beam mode component 1242 of apparatus 1202. In some aspects, the beam hopping mode may comprise beam hopping plus repetition. The repetition may be pre-configured or based on the RSRP report. In some aspects, the beam hopping mode may be enabled if the RSRP of the current beam is less than a third threshold, and none of the at least one beam has an RSRP that is greater than a first threshold in comparison to the RSRP of the current beam. In some aspects, the beam hopping mode may comprise the current beam and a subset of beams of the at least one beam. In some aspects, the beam hopping mode may comprise a subset of beams of the at least one beam and may exclude the current beam. In some aspects, a resource originally scheduled may be skipped when the beam hopping mode is enabled. In some aspects, the resource originally scheduled may be monitored using a different beam from the subset of beams when the beam hopping mode is enabled.

In yet another example, at 1112, the base station may switch to a different beam. For example, 1112 may be performed by beam mode component 1242 of apparatus 1202. The base station may switch to the different beam for communication with the UE. In some aspects, the different beam may correspond to a beam from the at least one beam indicated in the RSRP report.

At 1106, the base station may transmit an indication in response to the RSRP report. For example, 1106 may be performed by indication component 1244 of apparatus 1202. The base station may transmit the indication to the UE in response to receiving the RSRP report from the UE. In some aspects, the indication may acknowledge receipt of the RSRP report received from the UE. In some aspects, the indication may comprise a beam mode selected by the base station. For example, the base station may receive the RSRP report and select a beam mode for communication with the UE based on the RSRP report. In some aspects, the RSRP report may comprise an indication of a beam mode selected by the UE, such that the base station may override the beam mode selected by the UE. The base station may transmit the indication to the UE having a beam mode selected by the base station that overrides the beam mode selected by the UE. Communication between the UE and the base station may be based on the beam mode selected by the base station.

At 1114, the base station may communicate based on the selected beam mode. For example, 1114 may be performed by communication component 1246 of apparatus 1202. The base station may communicate with the UE based on the selected beam mode.

Figure 12:
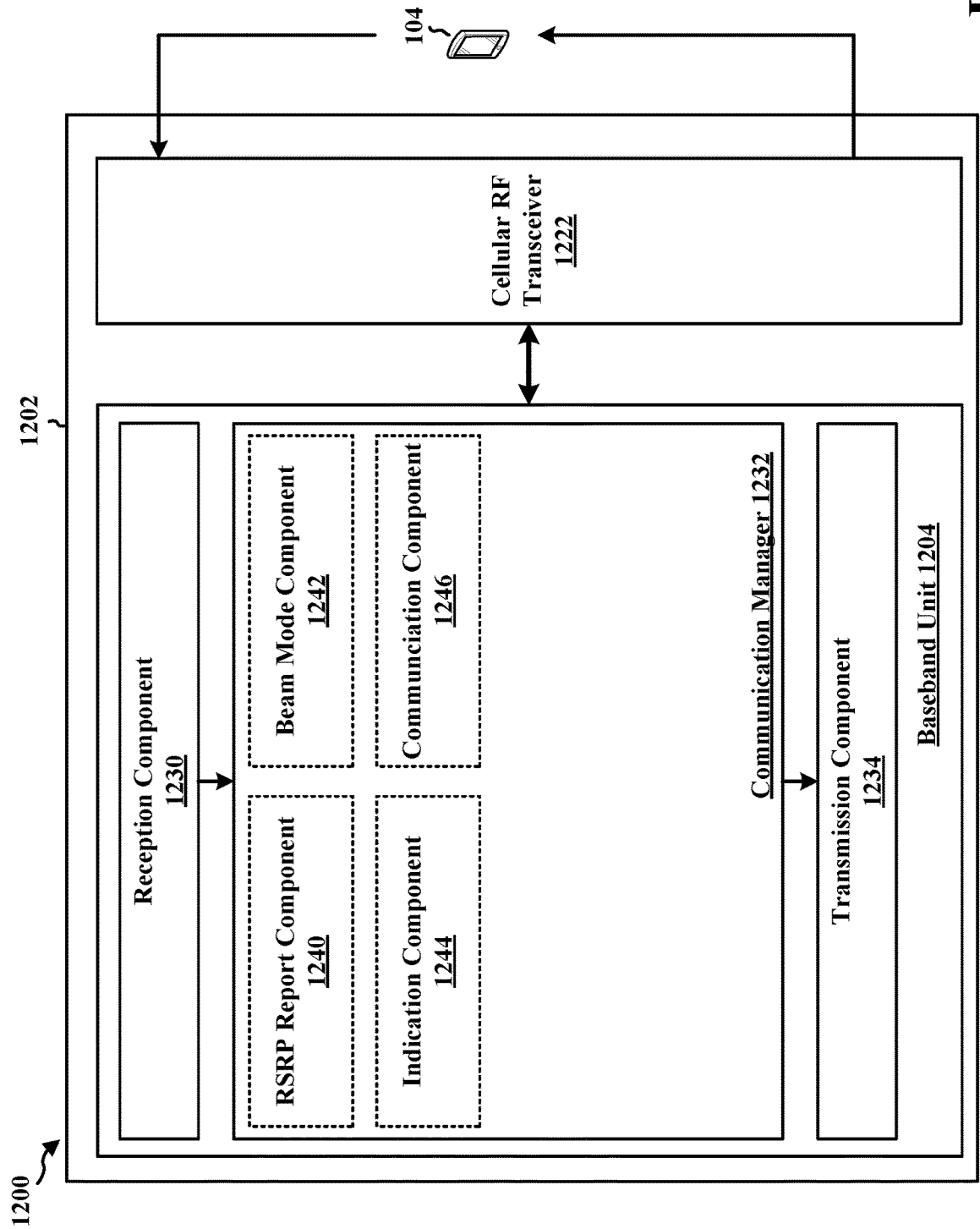
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes an RSRP report component 1240 that may receive an RSRP report of a current beam and at least one beam, e.g., as described in connection with 1002 of FIG. 10 or 1102 of FIG. 11. The communication manager 1232 further includes a beam mode component 1242 that may select a beam mode for communication with the UE, e.g., as described in connection with 1004 of FIG. 10 or 1104 of FIG. 11. The beam mode component 1242 may be further configured to maintain communication with the UE with the current beam of the UE, e.g., as described in connection with 1108 of FIG. 11. The beam mode component 1242 may be further configured to enable a beam hopping mode for communication with the UE, e.g., as described in connection with 1110 of FIG. 11. The beam mode component 1242 may be further configured to switch to a different beam, e.g., as described in connection with 1112 of FIG. 11. The communication manager 1232 further includes an indication component 1244 that may transmit an indication in response to the RSRP report, e.g., as described in connection with 1106 of FIG. 11. The communication manager 1232 further includes a communication component 1246 that may communicate based on the selected beam mode, e.g., as described in connection with 1006 of FIG. 10 or 1114 of FIG. 11.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for receiving, from a UE, an RSRP report of a current beam and at least one beam. The apparatus includes means for selecting a beam mode for communication with the UE based on the RSRP report of the current beam and the at least one beam. The apparatus includes means for communicating with the UE based on a selected beam mode. The apparatus further includes means for transmitting, to the UE, an indication that acknowledges receipt of the RSRP report or comprises the beam mode selected by the base station. Communication between the UE and the base station is based on the beam mode selected by the base station. The apparatus further includes means for maintaining communication with the current beam of the UE. The apparatus further includes means for enabling a beam hopping mode for communication with the UE. The apparatus further includes means for switching to a different beam for communication with the UE. The different beam corresponds to a beam from the at least one beam indicated in the RSRP report. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to measure a RSRP of a current beam and at least one beam; select a beam mode for communication with a base station based on an RSRP report of the current beam and the at least one beam; provide, to the base station, the RSRP report of the current beam and the at least one beam; and communicate with the base station based on a selected beam mode.

Aspect 2 is the apparatus of aspect 1, further including a transceiver coupled to the at least one processor.

Aspect 3 is the apparatus of any of aspects 1 and 2, further includes that the beam mode comprises at least one of maintain communication with the current beam, switch to a different beam, or enable a beam hopping mode.

Aspect 4 is the apparatus of any of aspects 1-3, further includes that the RSRP report comprises an indication indicating the beam mode selected by the UE.

Aspect 5 is the apparatus of any of aspects 1-4, further includes that the at least one processor is further configured to receive, from the base station, an indication that acknowledges receipt of the RSRP report or comprises the beam mode selected by the base station, wherein communication between the UE and the base station is based on the beam mode selected by the base station.

Aspect 6 is the apparatus of any of aspects 1-5, further includes that the at least one processor is further configured to maintain communication with the current beam.

Aspect 7 is the apparatus of any of aspects 1-6, further includes that communication is maintained with the current beam if none of the at least one beam has an RSRP that is greater than a first threshold in comparison to the RSRP of the current beam, or if the current beam has an RSRP that is greater than a second threshold.

Aspect 8 is the apparatus of any of aspects 1-7, further includes that the at least one processor is further configured to enable a beam hopping mode for communication with the base station.

Aspect 9 is the apparatus of any of aspects 1-8, further includes that the beam hopping mode comprises beam hopping plus repetition, wherein the repetition is pre-configured or based on the RSRP report.

Aspect 10 is the apparatus of any of aspects 1-9, further includes that the beam hopping mode is enabled if the RSRP of the current beam is less than a third threshold, and none of the at least one beam has an RSRP that is greater than a first threshold in comparison to the RSRP of the current beam.

Aspect 11 is the apparatus of any of aspects 1-10, further includes that the beam hopping mode comprises the current beam and a subset of beams of the at least one beam.

Aspect 12 is the apparatus of any of aspects 1-11, further includes that the beam hopping mode comprises a subset of beams of the at least one beam and excludes the current beam.

Aspect 13 is the apparatus of any of aspects 1-12, further includes that a resource originally scheduled is skipped or is monitored using a different beam from the subset of beams when the beam hopping mode is enabled.

Aspect 14 is the apparatus of any of aspects 1-13, further includes that the at least one processor is further configured to switch to a different beam for communication with the base station, wherein the different beam comprises a beam from the at least one beam.

Aspect 15 is a method of wireless communication for implementing any of aspects 1-14.

Aspect 16 is an apparatus for wireless communication including means for implementing any of aspects 1-14.

Aspect 17 is a computer-readable medium storing computer executable code, where the code when executed by a processor causes the processor to implement any of aspects 1-14.

Aspect 18 is an apparatus for wireless communication at a base station including at least one processor coupled to a memory and configured to receive, from a UE, a RSRP report of a current beam and at least one beam; select a beam mode for communication with the UE based on the RSRP report of the current beam and the at least one beam; and communicate with the UE based on a selected beam mode.

Aspect 19 is the apparatus of aspect 18, further including a transceiver coupled to the at least one processor.

Aspect 20 is the apparatus of any of aspects 18 and 19, further includes that the beam mode comprises at least one of maintain communication with the current beam, switch to a different beam, or enable a beam hopping mode.

Aspect 21 is the apparatus of any of aspects 18-20, further includes that the RSRP report comprises an indication indicating the beam mode selected by the UE.

Aspect 22 is the apparatus of any of aspects 18-21, further includes that the at least one processor is further configured to transmit, to the UE, an indication that acknowledges receipt of the RSRP report or comprises the beam mode selected by the base station, wherein communication between the UE and the base station is based on the beam mode selected by the base station.

Aspect 23 is the apparatus of any of aspects 18-22, further includes that the at least one processor is further configured to maintain communication with the current beam of the UE.

Aspect 24 is the apparatus of any of aspects 18-23, further includes that communication is maintained with the current beam if none of the at least one beam has an RSRP that is greater than a first threshold in comparison to the RSRP of the current beam, or if the current beam has an RSRP that is greater than a second threshold.

Aspect 25 is the apparatus of any of aspects 18-24, further includes that the at least one processor is further configured to enable a beam hopping mode for communication with the UE.

Aspect 26 is the apparatus of any of aspects 18-25, further includes that the beam hopping mode comprises beam hopping plus repetition, wherein the repetition is pre-configured or based on the RSRP report.

Aspect 27 is the apparatus of any of aspects 18-26, further includes that the beam hopping mode is enabled if the RSRP of the current beam of the UE is less than a third threshold, and none of the at least one beam has an RSRP that is greater than a first threshold in comparison to the RSRP of the current beam.

Aspect 28 is the apparatus of any of aspects 18-27, further includes that the beam hopping mode comprises the current beam of the UE and a subset of beams of the at least one beam.

Aspect 29 is the apparatus of any of aspects 18-28, further includes that the beam hopping mode comprises a subset of beams of the at least one beam and excludes the current beam of the UE.

Aspect 30 is the apparatus of any of aspects 18-29, further includes that a resource originally scheduled by the base station is skipped by the UE or is monitored by the UE using a different beam from the subset of beams when the beam hopping mode is enabled.

Aspect 31 is the apparatus of any of aspects 18-30, further includes that the at least one processor is further configured to switch to a different beam for communication with the UE, wherein the different beam corresponds to a beam from the at least one beam indicated in the RSRP report.

Aspect 32 is a method of wireless communication for implementing any of aspects 18-31.

Aspect 33 is an apparatus for wireless communication including means for implementing any of aspects 18-31.

Aspect 34 is a computer-readable medium storing computer executable code, where the code when executed by a processor causes the processor to implement any of aspects 18-31.

What is claimed is:

1. An apparatus for wireless communication at a user equipment (UE), comprising:
   a memory; and
   at least one processor coupled to the memory and configured to:
      measure a reference signal received power (RSRP) of a current beam and at least one beam;
      select a beam mode for communication with a base station based on an RSRP report of the current beam and the at least one beam;
      provide, to the base station, the RSRP report of the current beam and the at least one beam, wherein the RSRP report comprises an indication indicating the beam mode selected by the UE; and
      communicate with the base station based on a selected beam mode.

2. The apparatus of claim 1, further comprising a transceiver coupled to the at least one processor.

3. The apparatus of claim 1, wherein the beam mode comprises at least one of maintain the communication with the current beam, switch to a different beam, or enable a beam hopping mode.

4. The apparatus of claim 1, wherein the at least one processor is further configured to:
   receive, from the base station, an indication that acknowledges receipt of the RSRP report or comprises the beam mode selected by the base station, wherein the communication between the UE and the base station is based on the beam mode selected by the base station.

5. The apparatus of claim 3, wherein the at least one processor is further configured to:
   maintain the communication with the current beam.

6. The apparatus of claim 5, wherein the communication is maintained with the current beam if none of the at least one beam has an RSRP that is greater than a first threshold in comparison to the RSRP of the current beam, or if the current beam has an RSRP that is greater than a second threshold.

7. The apparatus of claim 3, wherein the at least one processor is further configured to:
   enable the beam hopping mode for the communication with the base station.

8. The apparatus of claim 7, wherein the beam hopping mode comprises beam hopping plus repetition, wherein the repetition is pre-configured or based on the RSRP report.

9. The apparatus of claim 7, wherein the beam hopping mode is enabled if the RSRP of the current beam is less than a third threshold, and none of the at least one beam has an RSRP that is greater than a first threshold in comparison to the RSRP of the current beam.

10. The apparatus of claim 7, wherein the beam hopping mode comprises the current beam and a subset of beams of the at least one beam.

11. The apparatus of claim 7, wherein the beam hopping mode comprises a subset of beams of the at least one beam and excludes the current beam.

12. The apparatus of claim 11, wherein a resource originally scheduled is skipped or is monitored using a different beam from the subset of beams when the beam hopping mode is enabled.

13. The apparatus of claim 3, wherein the at least one processor is further configured to:
   switch to the different beam for the communication with the base station, wherein the different beam comprises a beam from the at least one beam.

14. A method of wireless communication at a user equipment (UE), comprising:
   measuring a reference signal received power (RSRP) of a current beam and at least one beam;
   selecting a beam mode for communication with a base station based on an RSRP report of the current beam and the at least one beam;
   providing, to the base station, the RSRP report of the current beam and the at least one beam, wherein the RSRP report comprises an indication indicating the beam mode selected by the UE; and communicating with the base station based on a selected beam mode.

15. An apparatus for wireless communication at a base station, comprising:
a memory; and
at least one processor coupled to the memory and configured to:
receive, from a user equipment (UE), a reference signal received power (RSRP) report of a current beam and at least one beam, wherein the RSRP report comprises an indication indicating a beam mode selected by the UE;
select the beam mode for communication with the UE based on the RSRP report of the current beam and the at least one beam; and
communicate with the UE based on a selected beam mode.

16. The apparatus of claim 15, further comprising a transceiver coupled to the at least one processor.

17. The apparatus of claim 15, wherein the beam mode comprises at least one of maintain the communication with the current beam, switch to a different beam, or enable a beam hopping mode.

18. The apparatus of claim 15, wherein the at least one processor is further configured to:
transmit, to the UE, an indication that acknowledges receipt of the RSRP report or comprises the beam mode selected by the base station, wherein the communication between the UE and the base station is based on the beam mode selected by the base station.

19. The apparatus of claim 17, wherein the at least one processor is further configured to:
maintain the communication with the current beam of the UE.

20. The apparatus of claim 19, wherein the communication is maintained with the current beam if none of the at least one beam has an RSRP that is greater than a first threshold in comparison to the RSRP of the current beam, or if the current beam has an RSRP that is greater than a second threshold.

21. The apparatus of claim 17, wherein the at least one processor is further configured to:
enable the beam hopping mode for the communication with the UE.

22. The apparatus of claim 21, wherein the beam hopping mode comprises beam hopping plus repetition, wherein the repetition is pre-configured or based on the RSRP report.

23. The apparatus of claim 21, wherein the beam hopping mode is enabled if the RSRP of the current beam of the UE is less than a third threshold, and none of the at least one beam has an RSRP that is greater than a first threshold in comparison to the RSRP of the current beam.

24. The apparatus of claim 21, wherein the beam hopping mode comprises the current beam of the UE and a subset of beams of the at least one beam.

25. The apparatus of claim 21, wherein the beam hopping mode comprises a subset of beams of the at least one beam and excludes the current beam of the UE.

26. The apparatus of claim 25, wherein a resource originally scheduled by the base station is skipped by the UE or is monitored by the UE using a different beam from the subset of beams when the beam hopping mode is enabled.

27. The apparatus of claim 17, wherein the at least one processor is further configured to:
switch to the different beam for the communication with the UE, wherein the different beam corresponds to a beam from the at least one beam indicated in the RSRP report.

28. A method of wireless communication at a base station, comprising:
receiving, from a user equipment (UE), a reference signal received power (RSRP) report of a current beam and at least one beam, wherein the RSRP report comprises an indication indicating a beam mode selected by the UE;
selecting the beam mode for communication with the UE based on the RSRP report of the current beam and the at least one beam; and
communicating with the UE based on a selected beam mode.

* * * * *